Nov. 19, 1929.  W. A. MILLER  1,735,930
DUMPING GATE FOR DUMPING TRUCKS
Filed July 11, 1927  2 Sheets-Sheet 1
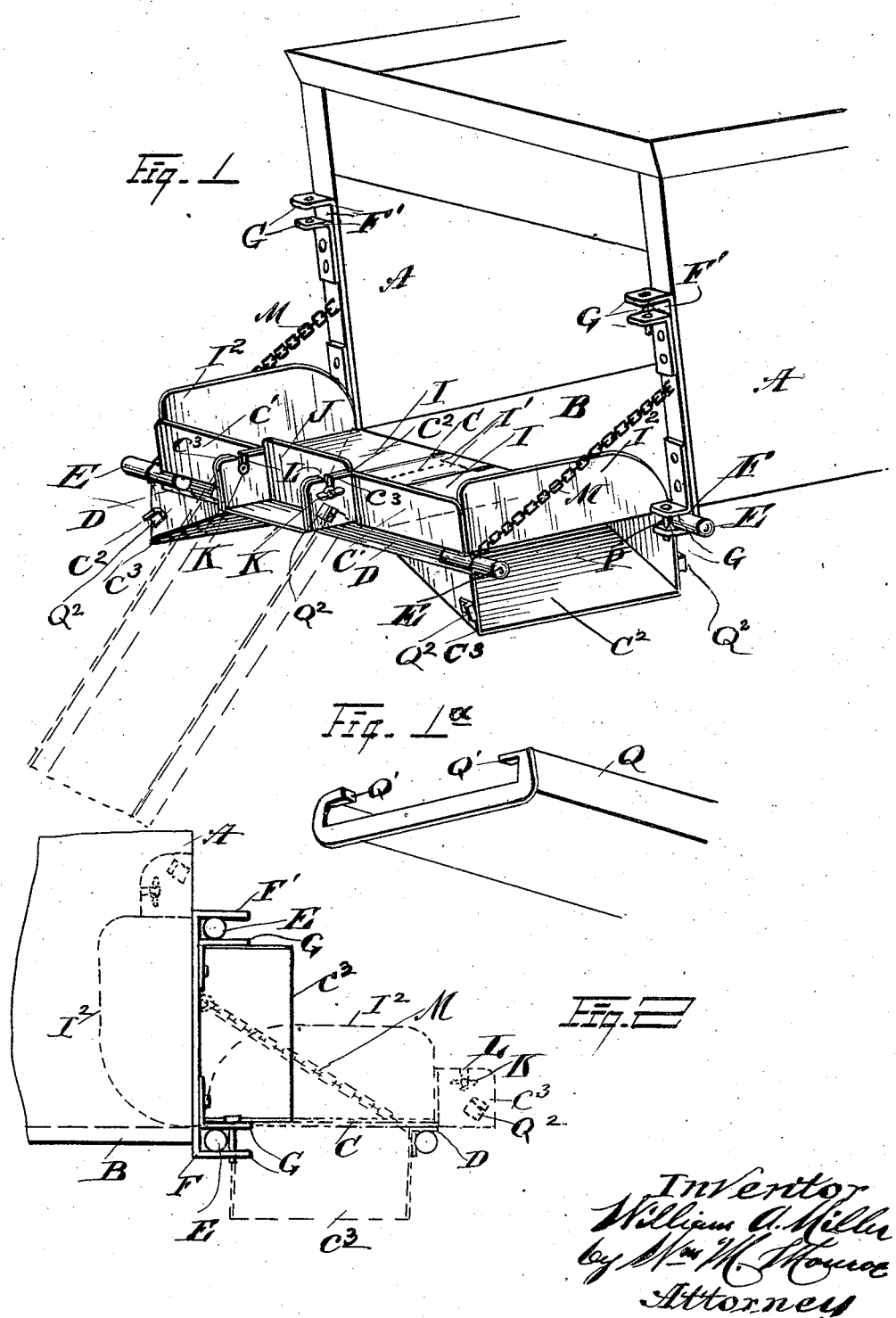

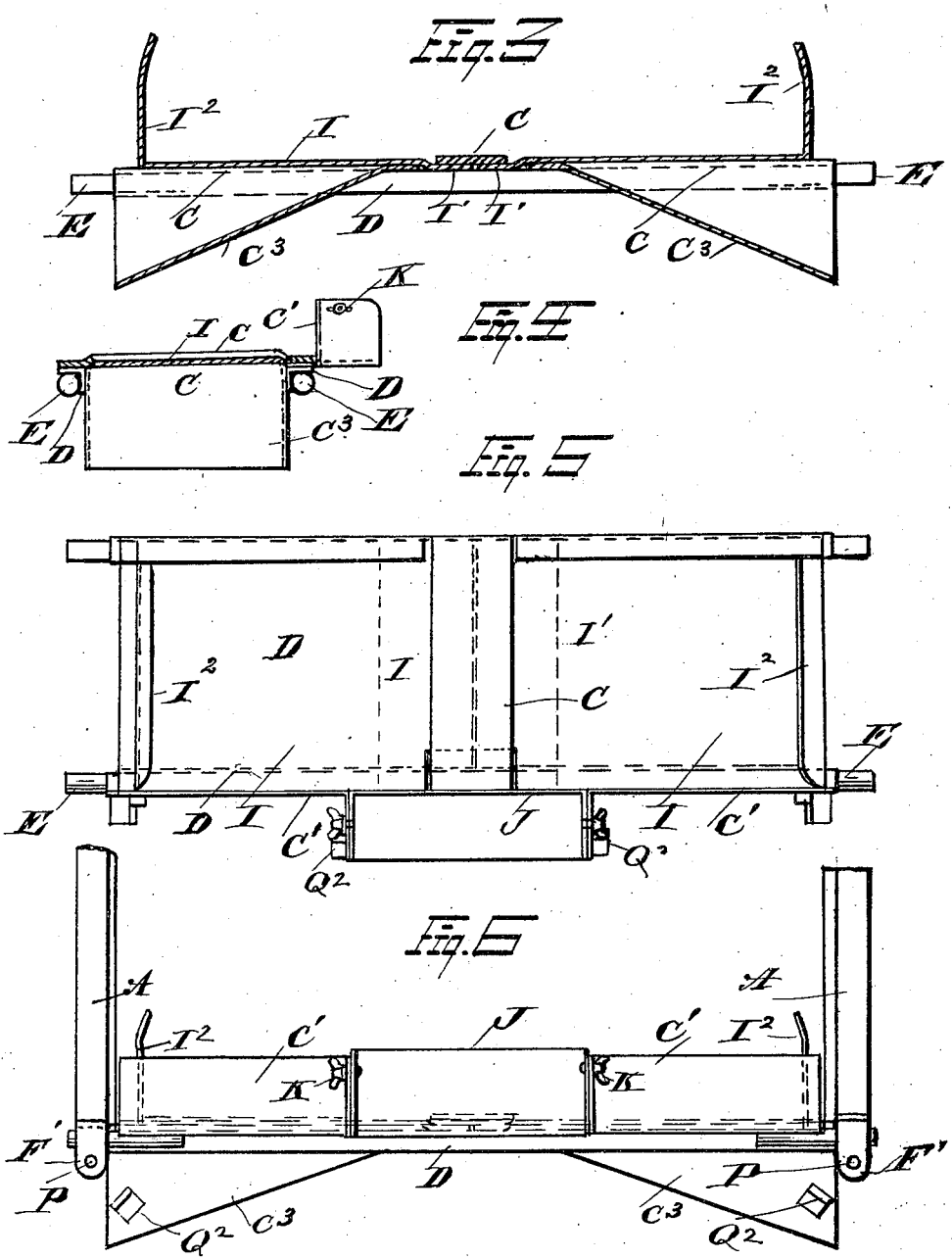

Patented Nov. 19, 1929

1,735,930

UNITED STATES PATENT OFFICE

WILLIAM A. MILLER, OF LORAIN, OHIO

DUMPING GATE FOR DUMPING TRUCKS

Application filed July 11, 1927. Serial No. 204,741.

The objects of the invention are to provide improvements in unloading means for dump wagons, which are designed to permit unloading from the extreme rear end of the wagon and utilizing the end gate as a chute which when lowered will deliver the load from either side of the wagon or directly to the rear thereof, thus permitting the wagon to unload from either side beyond the extreme end thereof without backing up to the unloading position, or permitting it to unload directly from the rear when it is backed to the unloading position.

In this device the end gate can also be lifted up on pivots and upon its upper edge so that the load can be discharged quickly from the open rear end of the wagon.

The device includes a rear end gate having projecting journals upon its upper and lower edges and corresponding bearings upon the rear edges of the side walls of the wagon, in which the journals are detachably secured thus permitting the end gate to be lowered when it is desired to employ it as a delivery chute, or to be raised when it is desired to discharge the load directly from the rear end of the wagon.

The device also includes the provision of an end gate having side delivery chutes, at its extremities and also having cover plates movable thereover to prevent the escape of the load when the gate is raised into place. The invention also includes the provision of a guard plate at its longitudinal rear edge, to prevent the load from passing over the rear edge when the gate is lowered and a rearwardly extended chute therein and a cover plate therefor which can be detached when it is desired to discharge the load rearwardly through the gate.

The invention is hereinafter further described, illustrated in the accompanying drawings and specifically pointed out in the claims.

In the accompanying drawings,

Fig. 1 is a perspective of the wagon gate;
Fig. 1ᵃ is a perspective of the chute;
Fig. 2 is a side elevation of the gate;
Fig. 3 is a transverse section thereof;
Fig. 4 is a transverse section therethrough at right angles to the section of Fig. 3;
Fig. 5 is a plan thereof showing the gate lowered;
Fig. 6 is an end elevation thereof.

In the accompanying drawings, A, A, represent the side walls of the wagon, B represents the floor thereof, C is the end gate which is formed preferably of sheet metal and its longitudinal edges are reinforced with angle bars D, D, and the journals E, E, project from the extremities thereof, at each end. By means of these journals and vertically spaced bearings F, F', therefor upon the vertical rear edges of the side walls of the dump wagon, the end gate may be suspended from its upper edge at F' and raised to permit the load to be discharged directly from the wagon, or it may be hinged at its lower edge at F and dropped down as shown in Figure 1 so that the load will pass through it when the wagon is tilted for this purpose.

By means of the construction shown the load may be discharged at the option of the driver in either of three directions; that is from either side of the wagon or through the rear retaining wall of the end gate.

To permit of these actions, the end gate is bent over at right angles at C' to form a a rear retaining wall when the gate is lowered, and is also inclined outwardly at C² C² on each side to form side delivery chutes, having side walls, C³ C³, the edges of which are secured to the aforesaid angle bars D, D. To prevent the load from passing out of these side chutes when the end gate is raised, cover plates I, I are provided, the inner extremities of which are secured by inserting their reduced ends I' I' underneath the central flat wall C of the gate as shown in Figures 1 and 3.

These cover plates are provided with raised retaining walls I², I², at their outer ends that prevent the load from escaping from the side of the car when it is desired to deliver the load directly to the rear, and not through the side chutes. These cover plates can easily be pulled out when it is desired to discharge the load from the side of the wagon.

When it is desired to discharge the load directly to the rear, a cover J is removed from an opening C² in the retaining wall C' and the load is discharged through the chute formed by projecting of the walls C³ from the sides of the opening.

The cover J is secured by means of thumb screws K, K, fitted in slots L, L, in the walls of the cover and chute. Chains M, M, suspend the end gate when lowered. The bearings F, F' for the journals of the end gate may be simply constructed of metal straps G, G, having projecting ends G between which the journals are detachably secured by dropping retaining pins P, through the openings therein.

Portable chutes Q as shown in Figure 1ª are provided with inwardly turned lugs Q' which engage with inclined lugs Q² upon the sides of the chutes on the end gate and hold the portable chutes in position.

Having described the invention what I claim as new and desire to secure by Letters Patent is:

1. In an unloading gate for a dump wagon or analogous device, a plate having reinforced longitudinal edges, terminated by projecting journals and provided with a marginal outer retaining wall at right angles thereto, said wall having a discharge opening and a detachable cover for said opening.

2. In an unloading gate for a dump wagon or analogous device, a plate having reinforced longitudinal edges, terminated by projecting journals and provided with a marginal outer retaining wall at right angles thereto, said wall having a discharge opening and a detachable cover for said opening and projecting walls about said opening providing a delivery chute therefor.

3. In an unloading gate for a dump wagon or analogous device, a plate having reinforced longitudinal edges, terminated by projecting journals and provided with a marginal outer retaining wall at right angles thereto, said wall having a discharge opening and a detachable cover for said opening and projecting walls about said opening providing a delivery chute therefor and means for securing said cover in place.

4. In a dump wagon in combination an end gate pivoted thereto, said end gate having a rear retaining outer wall and detachable end walls, said end gate having also an unloading chute in its rear retaining outer wall.

5. In a dump wagon in combination an end gate pivoted thereto, said end gate having a rear retaining outer wall and detachable end walls, said end gate having also an unloading chute in its rear retaining outer wall, and having also a side delivery chute in each end thereof, said detachable end walls having also attached portions forming covers for said side delivery chutes.

6. In combination with an end gate for a dump wagon, a plate horizontally extended from the upper edge of said end gate, said horizontal plate becoming a vertical guard plate when said gate is lowered, said guard plate being provided with a discharge opening intermediate of its ends, said end gate being provided with laterally directed discharge openings at its ends and inclined chutes leading to said openings.

7. In combination with an end gate for a dump wagon, a plate horizontally extended from the upper edge of said end gate, said horizontal plate becoming a vertical guard plate when said gate is lowered, said guard plate being provided with a discharge opening intermediate of its ends, said end gate being provided with laterally directed discharge openings at its ends and inclined chutes leading to said openings, and detachable closures for said rearwardly directed opening in said guard plate and for the openings leading from said chutes.

In testimony whereof I affix my signature.

WILLIAM A. MILLER.